United States Patent [19]

Papalos et al.

[11] 4,054,617

[45] Oct. 18, 1977

[54] PHENOL-ALKYLPHENOL PHOSPHATES

[75] Inventors: John G. Papalos, Ledgewood; James M. Kelly, Belford, both of N.J.

[73] Assignee: Diamond Shamrock Corporation, Cleveland, Ohio

[21] Appl. No.: 651,959

[22] Filed: Jan. 23, 1976

Related U.S. Application Data

[60] Continuation-in-part of Ser. No. 405,113, Oct. 10, 1973, Pat. No. 3,934,975, which is a continuation of Ser. No. 206,969, Dec. 10, 1971, abandoned, which is a division of Ser. No. 93,839, Nov. 30, 1970, abandoned.

[51] Int. Cl.$^2$ .......... C07F 9/09

[52] U.S. Cl. .......... 260/930; 260/978; 260/980

[58] Field of Search .......... 260/930, 978, 980

[56] References Cited

FOREIGN PATENT DOCUMENTS 465,567 5/1950 Canada .......... 260/930

*Primary Examiner*—Anton H. Sutto

*Attorney, Agent, or Firm*—John C. Tiernan

[57] ABSTRACT

Leather treating compositions are prepared which comprise condensed or polymeric alkyl phenol phosphates generally and more particularly a phenol-alkylphenol condensate which is subsequently alkoxylated and phosphated. These compositions may be utilized for leather processing, and specifically for: retanning, lubricating, and imparting water resistance to chrome and/or mineral tanned leather. Additionally, these compositions may be used to effect modifications of base mineral tannages for the purpose of dyeing, bleaching, and fatliquoring leather.

1 Claim, No Drawings

PHENOL-ALKYLPHENOL PHOSPHATES

CROSS REFERENCE TO RELATED APPLICATIONS

This is a continuation-in-part of application Ser. No. 405,113, filed Oct. 10, 1973, now U.S. Pat. No. 3,934,975 issued Jan. 27, 1976, which application was a continuation of application Ser. No. 206,969, filed Dec. 10, 1971, now abandoned, which in turn was a division of application Ser. No. 93,839, filed Nov. 30, 1970, now abandoned.

BACKGROUND OF THE INVENTION

Chrome and/or mineral tanned leathers are at present retanned with syntans, vegetable extracts and/or resins of various types. This is done to impart retan effects or characteristics which chrome and/or mineral tanned leather does not of itself possess. The effects or characteristics include: bleaching, dye assisting, plumping, increased weight, less shrinkage, better feel, better grain character, and buffability.

Conventional retan material generally imparts to chrome and/or mineral tanned leather a positive characteristic of rewetting and water absorption. Conventional leather lubricants applied as emulsions (fatliquors) generally add to this characteristic of wetting. Various materials such as: hydrophobic rubbers and resins, fluorocarbons, fatty chrome complexes, silicones, and waxes, are applied on top of conventional retan and fatliquor treatments to overcome the undesirable rewetting and water absorption characteristic imparted by these treatments. In many cases the result is sub-standard.

Known attempts to overcome this problem include the use of a fatliquor containing a polybasic acid ester (U.S. Pat. No. 2,950,950) and the use of a fatliquor containing an alkyl phosphate (U.S. Pat. No. 3,010,780). More recently, complete fatliquor systems incorporating alkyl phosphates as emulsifiers for leather oils have been developed to overcome the deficiencies of the above approaches.

All of the above systems are effective in lubricating leather, but do not supply a sufficient degree of internal water resistance unless used in excess. In order to achieve increased internal water resistance with the above systems, sufficient fatliquor must be added to penetrate the leather deeply, resulting in poor leather character and quality.

U.S. Pat. No. 2,454,542 to Bock discloses and claims polymeric alkylphenol condensates which are subsequently alkoxylated and phosphated. These compounds were prepared by condensing a $C_4$ or higher alkyl substituted phenol and preferably at least an octylphenol. While there is a brief suggestion that a mixture of phenols can be employed, the only mixture mentioned is p-tert-amyl and p-diisobutylphenols. In any case the lowest alkylphenol which could be employed in such a mixture would be butylphenol, since the Bock reference specifically teaches a preferred lower limit of $C_8$ alkylphenols, and an absolute lower unit of $C_4$ alkylphenols.

SUMMARY OF THE INVENTION

The novel compositions of the present invention comprise condensed or polymeric alkylphenol phosphates, and more particularly a phenol-alkylphenol condensate which is subsequently alkoxylated and phosphated. These compositions may be utilized for leather processing, and specifically for: retanning, lubricating, and imparting water resistance to chrome and/or mineral tanned leather. Additionally, these compositions may be used to effect modifications of base mineral tannages for the purpose of dyeing, bleaching, and fatliquoring leather.

These compositions may be utilized for leather processing, and specifically for: retanning, lubricating effects such as softening and primarily for imparting water resistance to chrome and/or mineral tanned leather. Additionally, these compositions may be used to affect modifications of base mineral tannages for the purpose of dyeing, bleaching, and fatliquoring leather.

Leather treatment systems incorporating the novel compositions of the present invention make it possible to gain internal water resistance and maintain good leather quality, relying less on the penetration of fatliquoring for its effect. This system replaces or supplements conventional retan materials thus improving the potential of all subsequent water repellant systems. This invention while providing better internal water resistance also provides retan effects.

PREFERRED EMBODIMENTS

The preferred compositions of the present invention are alkylene bridged phenol-alkylphenol condensates which have been alkoxylated and phosphated, and in which a. the phenol is at least one number selected from the group consisting of hydroxybenzene, cresols, ethylhydroxybenzenes, and fused ring-, polyaryl-, and polyaralkyl-polyphenols having from 2 to 15 benzene rings per molecule, including phenols and polyphenols substituted with at least one member of the group consisting of halogen atoms, nitro radicals, and additional hydroxyl radicals;

b. the alkylphenol is at least one member selected from the group consisting of saturated or unsaturated linear or branched chain $C_6$ or $C_{20}$ alkyl substituted phenols;

c. the phenol moiety of the alkylphenol is selected from at least one of a group consisting of phenols, thiophenols, and phenols substituted with at least one member of the group consisting of hydroxyl radicals, halogen atoms, nitro radicals, methyl radicals, ethyl radicals, propyl radicals and phenol radicals;

d. the ratio of phenol to alkylphenol in said condensate being from about 3:1 to about 1:3;

e. the alkoxylating agent is selected from at least one of a group consisting of ethylene oxide, propylene oxide, butylene oxide and iso-butylene oxide, and f. the phosphating agent is selected from at least one of a group consisting of polyphosphoric acid, phosphorous acid, and phosphorous oxychloride, further characterized in that the total number of benzene rings contained in one molecule of the condensate is between 3 and 16.

Useful aldehydes for effecting condensation of the phenols can be defined as including aldehydes, substituted aldehydes, and aldehyde liberating compositions. Examples of useful aldehydes include, but are not limited to: formaldehyde, paraformaldehyde, trioxane, hexamethylene tetramine, formalin, acetaldehyde, butyraldehyde, heptaldehyde, furfuraldehyde, chloral, alpha-ethyl-beta-propylacrolein, benzaldehyde, glyoxal, pyruvaldehyde, cinnamaldehyde, pyrocatechualdehyde, veratraldehyde, crotonaldehyde, diphenylacetaldehyde, 2-ethylisovaleraldehyde, glutaraldehyde, mucobromic acid, propionaldehyde, o-anisaldehyde, 9-anthraldehyde, bromobenzaldehyde, carboxybenzaldehyde, cyanobenzaldehyde, dibenzyloxybenzaldehyde, dibromosalicylaldehyde, dialdehyde starch, fluoronitrobenzaldehyde, indancarboxaldehyde, iodovanillin, isophthalaldehyde, mesitaldehyde, naphthaldehyde, convallatoxin, cymarin, ferrocenecarboxaldehyde, helveticoside, methylfurfuraldehyed, methylthiophenecarboxaldehyde, norbornenecarboxaldehyde, K-strophanthin, and the like. The preferred aldehydes or aldehyde-liberating compositions are formaldehyde, paraformaldehyde, trioxane, hexamethylene tetramine, formalin, acetaldehyde, propanaldehyde, and butyraldehyde.

In general, the compositions of the present invention are prepared by condensing a phenol and an alkylphenol with an aldehyde in the presence of an acid catalyst, neutralizing the catalyst with a strong base, alkoxylating then phosphating the resulting polymer preferably in solution. While direct phosphation of phenols is possible, prior alkoxylating is preferred because it tends to enhance the ultimate formation and recovery of the phosphated polymer in improved yield.

More specifically, the phenol and alkylphenol are charged into a vessel provided with a scrubber to neutralize acid fumes, and means to provide constant agitation. About 0.1 to about 1% by weight (as measured by the phenolalkyl phenol mixture) of an acid catalyst is slowly added to the mixture while maintaining agitation. The mixture is maintained at a temperature of from about 50° to 150° and preferably from about 90° to about 140° C while the aldehyde is slowly added to the mixture, usually over a period of from about 2 to about 6 hours, after which a temperature of from about 60° to about 150° C, and preferably from about 100° to about 140° C, is maintained for an additional one to five hours. A strong base is then added slowly in a quantity in excess of that required to completely neutralize any free acid, so as to render the resulting polymer mixture alkaline, and thereby facilitate alkoxylation.

The acid catalyst may be any strong inorganic acid which will not react with an aromatic ring. Suitable acids include sulfuric acid, the halogen acids, and substituted halogen acids, particularly useful acid being hydrochloric acid. Phosphoro- and nitro-acids are not suitable. Since the scrubber will result in removal of acid fumes formed by the high temperature of the mixture, it may be necessary to add additional acid if, excessive acid catalyst is lost due to such evaporation. The base may be any inorganic alkaline substance which will not react with an aromatic ring, such as for example sodium hydroxide, calcium hydroxide, magnesium hydroxide, potassium hydroxide, alkaline oxides, and the like.

The polymer mixture is stripped of any water, including that formed as a by-product of the reaction. The preferred stripping procedure is a vacuum of from about 24 to about 28 inches of mercury, for from about 15 to 60 minutes, until less than 0.1% water remains. The vacuum is then broken with nitrogen, and a nitrogen blanket is formed.

The polymer is then alkoxylated by adding an alkoxylating agent such as ethylene oxide, propylene oxide, butylene oxide, isobutylene oxide, mixtures thereof or the like, the preferred alkoxylating agent being ethylene oxide. The alkoxylating agent is added to the polymer in the ratio of from about 1 to about 20 moles and preferably from about 1 to about 3 moles of alkoxylating agent per hydroxy moiety of the polymer. The alkoxylation is carried out at a temperature of from about 100° to about 200° C and preferably at from about 120° to about 160° C at from about 10 to about 30 p.s.i.g.

Solvent is then added to adjust the solids content of the mixture to about 70% by weight for ease of handling. These polymers are selectively soluble in higher aromatic solvents such as toluene, chlorobenzene, xylene, and substituted chlorinated hydrocarbons such as ethylene dichloride. The preferred solvent is xylene. This is now an intermediate polymer solution comprising an alkoxylated alkylphenolpolyphenol condensate.

The intermediate polymer solution containing about 70% solids by weight is then charged into a vessel and heated to a temperature of from about 50° to about 70° C. The phosphating agent is then added in the ratio of from about 0.25 to about 4 moles and preferably from about 1 to about 2.5 moles per hydroxy moiety on the polymer. The phosphating agent is added slowly while maintaining the temperature at from about 50° to about 80° C, after which the mixture is heated to a temperature of from about 60° to about 150° and preferably from about 30° to about 110° C and maintained at this temperature for a period of from about 1½ to about 2½ hours, until phosphation is completed, generally phosphation of at least 50% of the hydroxyl (or alkoxyl) groups. A base is then added to adjust the composition to a neutral or slightly alkaline pH. It is not necessary to isolate the phosphated polymer, and in general the only adjustment made is the addition of sufficient water to adjust the solids content of the mixture to from about 35 to about 40% by weight, in order to facilitate application and handling in treating leather.

Useful phosphating agents include, but are not limited to: polyphosphoric acid, phosphorous pentoxide, pyrophosphoric acid, phosphoric acid, phospholeum (superphosphoric acid), phosphorous acid, phosphorous oxychloride, and the like. Preferred phosphating agents are polyphosphoric acid, phosphorous pentoxide, and phosphoric acid.

The following examples will illustrate preparation of some of the compounds within the scope of the present invention.

EXAMPLE I

| Ingredient | Parts by Weight (In Grams) |
|---|---|
| octylphenol | 30.03 |
| Bisphenol A (2, 2-bis(p-hydroxyphenol) propane) | 16.59 |
| paraformaldehyde flakes | 4.56 |
| 36% hydrochloric acid | .75 |
| 45% KOH | 1.08 |
| | 53.01 |

The preparation of this polymer was as follows, (unless otherwise noted or obvious from the context, all temperatures are ± 5° C).

CONDENSATION

The phenol (in this case Bisphenol A) and the alkylphenol were charged into a glass-lined agitator. The Bisphenol A and the octylphenol were thoroughly blended at a temperature of 95° C, and the hydrochloric acid was slowly added over a period of 15 minutes while agitation was continued. The mixture was then heated to 105° C and ingredient (C), the paraformaldehyde flakes, were added in 20 increments over a period of 3 to 4 hours, while maintaining the temperature of the mixture at from 105° to 110° C. The mixture was maintained at 120±5° C for 3 hours to form a polymer, then the potassium hydroxide was added slowly over a 30 minute period. The polymer was stripped of water under a vacuum of 25 inches of mercury for 30 minutes at a temperature of 150° C. The vacuum was then broken with nitrogen, and a nitrogen blanket was maintained thereafter until all of the phosphating agent was added.

ETHOXYLATION

The mixture was heated to 130° C and 19.71 grams of ethylene oxide were added. The temperature was raised to 140°±10° C at 25 p.s.i.g. and these conditions were maintained for 30 minutes, and 30.69 grams of xylene were added to adjust the solids content of about 70%. (The reaction mixture at this point is often referred to as the "intermediate polymer").

PHOSPHATION

The temperature of the reaction mixture was adjusted to 60° C and 8.26 grams of polyphosphoric acid were slowly added over a period of 2 to 3 hours, while maintaining the temperature at 60°-70° C. The mixture was then heated to 95°±5° C and maintained at this temperature for 2 hours. The mixture was then cooled to a temperature of less than 30° C. 17.57 grams of 45% potassium hydroxide and 38.77 grams of water were slowly added over a 2-hour period, while maintaining the temperature of the mixture at less than 40° C. Additional potassium hydroxide was then added to adjust the pH of a 5% solution to about 7. Finally, additional water was added to adjust the solids content of the mixture to about 37%.

It will, of course, be readily apparent that the phenol-alkylphenol condensate formed in Example I is not a single homogeneous product, but rather is a mixture of trimers, tetramers, etc. It is also obvious that the starting molar ratio of Bisphenol A:octylphenol:formaldehyde of 1:2:2 together with the significantly higher reactivity of the open ortho positions on each of the rings of the bisphenol A, will favor a mixture in which both the empirical structural formula, and the predominant single component would be:

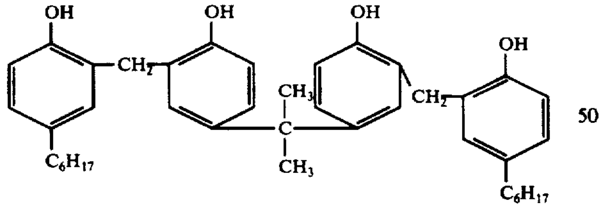

While this product is formed by condensing two moles of octylphenol with one mode of Bisphenol A, it will be apparent that it is easier to treat the compound as a tetramer, made up of four separate hydroxybenzene rings bridged by alkylene radicals. As noted earlier, the condensates of the present invention are characterized in that the total number of benzene rings contained in one molecule of the condensate is between 3 and 16 and preferably between 3 and about 8, the preferred emperical formula being from about 4 to about 6 benzene rings per molecule.

Application tests were conducted on products prepared in the manner of Example I, but phosphated (4) to 50% and (5) to 75% respectively as compared with (3) an alkyl diphenyl phosphate, (2) a substituted phenolic sulfonate, and (1) a chrome control in which there was no retannage. The tests were conducted in the following manner.

The leather used was Trostel stock 5-5½ oz. grains. All percentages are based on the wrung split shave weight as received, which is normally 40 to 50% water. The application procedure was as follows:

1. The stock was washed in 400% water for 15 minutes and drained. This removed the majority of the loose chrome salts and acids.
2. The stock was refloated in 100% water at 30 minutes.
   Test 1: 0.75% sodium bicarbonate
   Test 2: 0.50% sodium bicarbonate
   Test 3: 0.06% sodium bicarbonate
   Test 4: 0.06% sodium bicarbonate
   Test 5: 0.06% sodium bicarbonate
   The percentage of sodium bicarbonate was reduced for Tests 3-5 to compensate for the alkali content of samples.
3. The stock was washed in a float at 130° F for 10 minutes and drained, in order to remove remaining chrome salts as well as salts resulting from the neutralization step.
4. About 2 to 10% solids of the syntans to be tested per 100% water were added at 130° F and run for 1½ hours.
5. The systems were adjusted with formic acid to the lowest equilibrium pH and were run for 15 minutes.
6. The systems were adjusted with formic acid to a pH of 3.5 and run an additional 15 minutes.
7. The stock was washed for 10 minutes in cold water and mid-bend pieces were removed for non-fat observation.
8. The stock was heated to 130° F, washed for 10 minutes and drained.
9. The remaining pieces of stock were fatliquored with 8% solids per 100% float at 130° F. The fatliquor used was an emulsified oil, whose emulsifier is on a non-rewetting character.
10. The stock was rinsed, washed for 10 minutes and horsed up.
11. The stock was wrung out and tacked up to dry in an oven at 140° F for four hours.
12. The stock was allowed to lay over for three days to pick up moisture.
13. The stock was dried staked and tested for temper, water resistance, grain strength and light fastness.

The pieces which were removed in step (7) were not fatliquored, that is to say steps (8) and (9) were omitted, and these pieces were then separately tested using a standard Maesar Flex Test, the results of these tests being set forth in Table I. The remaining pieces were fatliquored, and the comparative results of standard Maesar Flex Tests on these samples are set forth in Table II.

TABLE I

| | 1* | 2* | 3* | 4* | 5* |
|---|---|---|---|---|---|
| | A. Tests with Fatliquor (Step 9) Omited | | | | |
| No. of flexes for initial water penetration | 52 | 40 | 1020 | 234 | 200 |
| cc of water transmitted in 8,000 flexes | 9 | 19 | 4 | 33 | 22 |
| percentage of water | | | | | |

TABLE I-continued

| | 1* | 2* | 3* | 4* | 5* |
|---|---|---|---|---|---|
| | A. Tests with Fatliquor (Step 9) Omited | | | | |
| compared to initial weight of stock absorbed in 8,000 flexes | 100 | 99 | 23 | 51 | 35 |

TABLE II

| | 1* | 2* | 3* | 4* | 5* |
|---|---|---|---|---|---|
| | B. Tests with Fatliquor (Step 9) included | | | | |
| No. of flexes for initial water penetration | 510 | 340 | 4000 | 285 | 611 |
| cc of water transmitted in 8,000 flexes | 13 | 32 | 0.2 | 48 | 11 |
| percentage of water compared to initial weight of stock absorbed in 8,000 flexes | 55 | 56 | 12 | 25 | 10 |

*[1]Control stock - no retannage (step 4)
*[2]Syntan was substituted phenolic sulfonate (50% solids) which is a conventional type
*[3]Syntan was an ethoxylated alkyl diphenyl phosphate (72% solids)
*[4]Syntan was an ethoxylated alkyl phenol-bisphenol which was 50% phosphated (80% solids) and which falls within the scope of this invention
*[5]Syntan was an ethoxylated alkyl phenol-bisphenol which was 75% phosphated (80% solids) and which falls within the scope of this invention The most important single evaluation criteria reported in the Table is, of course, the percentage of water absorbed by the stock. Low water absorption is clearly preferable, and such a quality is indicated by a lower number in the Table. It must be kept in mind that these numbers are relative rather than absolute, and water absorption is only one criteria. Thus, while stock No. 3 had the best water absorption resistance, this stock was completely unsatisfactory because of its poor aesthetic qualities, particularly excessively course and loose break (e.g. cracking at a fold) rendering it totally unsuitable for use in producing leather end products. Stocks Nos. 4 and 5, which were treated with compositions within the scope of the present invention, were clearly superior to stock No. 1 which had no syntan and stock No. 2 which used a conventional syntan. Also the stocks treated with the syntans within the scope of the present invention generally exhibited substantially improved overall properties when compared with the other three sets of test samples.

The composition of Example I, referred to in these test as Syntan 9, was also tested against materials designated as Syntan 10, prepared by an ethoxylating and phosphating Bisphenol A, and Syntan 11, prepared by ethoxylating and phosphating a condensate of octylphenol. Each of these syntans were used to impart water resistance to chrome tanned leather stock with and without fat liquoring. The effectiveness of these three materials (along with a blank) as waterproofing agents was determined in the following manner.

The leather stock used in this test was Ocean Leather Co. chrome tanned stock 4-4½ oz. single guage grain. All percentages were based on the wrung split and shaved weight as received. In these tests where a retanning agent was used, the level of application of the retanning agent was 5% solids. Since retanning agents vary in solids content, it was necessary to add varying amounts of the retanning agents based on their solids contents in order to obtain comparable applications upon the stock. Where a blank was run, a comparable amount of water was used. All sets of stocks used in these tests were trimmed to 200 g. The evaluation procedure was carried out utilizing the following steps:

1. The stock samples were washed in 300% water at 100° F for 20 minutes and drained.
2. The stock samples were refloated in 100% water at 100° F and a 3% level of Tanolin 225 (reduced chrome sulfate 100% solids) was added to each sample and the sample was milled for 30 minutes to retan. (See Table III for results of pH measurements at the end of this step and subsequent steps).
3. The stock samples were neutralized with 0.33% sodium bicarbonate. Each sample was milled for 20 minutes and then drained.
4. Each chrome retan stock sample was washed in 300% water at 100° F for 5 minutes and drained.
5. Two stock samples were treated with one of the following syntans: Syntan 9, Syntan 10, or Syntan 11. These samples were treated with 5% solids of the syntan dissolved in 100% water at 100° F. The syntan was added in two separate and equal feeds. After the first feed, each sample was milled for 20 minutes. After the second feed, the sample was milled for 25 minutes. The two blank samples, which were not treated with one of the syntans, were floated in 100% water at 100° F and were milled for 45 minutes.
6. 0.5% formic acid was then added to each of the stock samples and the samples were run for 20 minutes.
7. The stock samples were then treated with 3% Tanolin 225 dry without any float being present. The samples were then milled for 20 minutes and drained.
8. Each stock sample was then washed in 300% water at 125° F for 5 minutes and drained.
9. 1.6% solids application of a fat liquor was dissolved in 100% water at 125° F and added to the three samples treated with Syntans 9, 10, and 11, respectively, and one of the samples which was not treated with one of these syntans. The fat liquor was used as a non-rewetting emulsified oil containing 26% of an amine neutralized alkyl phosphate. These samples were milled for 45 minutes. The remaining samples were not fat-liquored and were only floated in 100% water at 125° F. These samples were milled for 45 minutes.
10. Each stock sample was treated again with 2% Tanolin 225 without an additional float. The samples were milled for 20 minutes and drained.
11. Each stock samples was then washed in 300% water at 80° F for 5 minutes and horsed up overnight.
12. The drained stocks were wrung to approximately 60% moisture and tacked out to dry in a 122° F oven for 5 hours.
13. The samples were allowed to lay overnight prior to the dry leather evaluation and flex measurements (water resisting tests) described below.

TABLE IIIA

| pH Measurements On Stock Samples With Fat Liquor | | | | | |
|---|---|---|---|---|---|
| | | Syntan 9 | Syntan 10 | Syntan 11 | Blank |
| After Step | 2 | 3.5 | 3.5 | 3.5 | 3.5 |
| " | 3 | 4.0 | 4.1 | 4.0 | 4.1 |
| " | 5 | 4.5 | 5.8 | 5.6 | 3.6 water |
| " | 6 | 3.5 | 3.7 | 3.7 | 3.0 |
| " | 7 | 3.4 | 3.6 | 3.6 | 3.1 |

TABLE IIIA-continued

| pH Measurements On Stock Samples With Fat Liquor | | | | | |
|---|---|---|---|---|---|
| | | Syntan 9 | Syntan 10 | Syntan 11 | Blank |
| " | 9 | 3.5 | 3.7 water | 3.7 | 3.3 water |
| " | 10 | 3.6 | 3.6 | 3.6 | 3.3 |

TABLE IIIB

| pH Measurements On Stock Samples Without Fat Liquor | | | | | |
|---|---|---|---|---|---|
| | | Syntan 9 | Syntan 10 | Syntan 11 | Blank |
| After Step | 2 | 3.5 | 3.5 | 3.5 | 3.5 |
| " | 3 | 4.0 | 4.0 | 4.0 | 4.1 |
| " | 5 | 4.5 | 6.0 water | 5.7 | 3.6 |
| " | 6 | 3.4 | 3.7 | 3.7 | 2.9 |
| " | 7 | 3.3 | 3.5 | 3.6 | 3.0 |
| " | 9 | 3.3 water | 3.6 | 3.6 water | 3.1 |
| " | 10 | 3.5 | 3.6 | 3.6 | 3.2 |

PROCESSING OBSERVATIONS

During step 5 of the above procedure, Syntan 9 foamed considerably more than Syntan 10 or Syntan 11 in the tests. However, after 15 minutes, foaming with all three syntans tended to equalize. All three syntans, as evidenced by leather feel, exhausted well.

During step 9, takeup of fat liquor in those tests where the leathers were fatliquored was at the same rate and was complete. After chrome topping, the fatliquored leathers which were retanned with Syntans 9, 10, and 11 beaded water to the same extent and were considerably better than the leathers which were retanned with Syntans 9, 10, and 11 but were not fatliquored.

DRY LEATHER EVALUATION

Leather treated in the above tests was examined visually and by feel. Observations are reported as follows:

Fat-liquored leather produced with Syntan 9 was a very desirable leather. It was full mellow leather, had tight break and pleasant surface feel. Fat-liquored leather produced with Syntan 10 had a temper midway between leather produced with Syntan 9 and Syntan 10 and demonstrated a poorer break than leather produced with either Syntan 9 or Syntan 11. Surface of leather was very pronounced and tended to show dryness. Fatliquored leather produced with Syntan 11 was a very firm, crusty type leather. Break of the leather was satisfactory but the grain had a pronounced porous appearance. The blank, a fatliquored leather, which had not been retanned, was a very crusty, firm leather. Leathers produced with Syntans 9, 10, and 11, which were not fatliquored, demonstrated the same variations as those which were fatliquored, but only on a much more magnified scale.

The dry leather evaluation tests clearly demonstrated that Syntan 9, a composition within the scope of this application, produced superior fatliquored and non-fatliquored leather when compared with leathers produced with Syntan 10 and Syntan 11 compositions of the prior art as well as with blanks which were not retanned with a syntan.

FLEX MEASUREMENTS

The above leathers including those treated with Syntans 9, 10, and 11 as well as the blanks were subjected to non-rewet tests using a Maesar Flex instrument. These tests measure the water resistance of leather exposed to water during flexing, i.e., they simulate penetration of water into shoes during walking in water. In these tests, swatches were cut from the "middle" piece of each leather sample and flexed to obtain the data shown in Tables IVA and IVB. The data in Tables IVA and IVB demonstrate that Syntan 9 and 10 give the best results on stock samples both with and without fat liquor.

Table IVA

| Flex Measurements On Stock Samples With Fat Liquor | | | | |
|---|---|---|---|---|
| Test with | Syntan 9 | Syntan 10 | Syntan 11 | Blank |
| No. of flexes before initial water penetration | 660 | 1960 | 275 | 80 |
| Percent water absorbed at 3000 flexes | 35 | 22 | 92 | 73 |

Table IVB

| Flex Measurements On Stock Samples Without Fat Liquor | | | | |
|---|---|---|---|---|
| Test with | Syntan 9 | Syntan 10 | Syntan 11 | Blank |
| No. of flexes before initial water penetration | 235 | 420 | 35 | 15 |
| Percent water absorbed at 3000 flexes | 108 | 79 | 130 | 119 |

The flex measurements demonstrated that the water resistance of fatliquored and non-fatliquored leathers produced with Syntan 9 and Syntan 10 were superior to the leathers produced by Syntan 11 as well as with blanks which were not retanned with a syntan. In other words, Syntan 9 not only demonstrated desirable water resistance properties, but also was clearly superior on a dry evaluation basis.

EXAMPLE II

Another phosphated phenol alkylphenol condensate was prepared by charging 20.30 grams of o-cresol, 0.23 grams of 36% hydrochloric acid, and 3.10 grams of paraformaldehyde flakes to the reactor of Example I at a temperature of 92°-100° C over a period of about 1½ hours, after which the mixture was reflexed for four hours at 110° C to form the methylene bisphenol dimer of the ortho-cresol. 38.8 grams of octylphenol, additional 0.66 grams of hydrochloric acid, and an additional 5.65 grams of paraformaldehyde flakes were then charged to the reaction vessel using the procedures and conditions described in Example I, including those set forth for the subsequent ethoxylation and phosphating procedures. Again the final phosphated produce was adjusted to substantially a neutral pH, and a solids contents of about 37%.

EXAMPLE III

A further phenol-alkylphenol condensate was prepared from ortho-cresol and octylphenol but in this case there was no separate condensation of the ortho-cresol to the methyl bisphenol. Instead, the exact same procedure as that of Example I was followed, with 51.5 grams of octylphenol and 27.0 grams of ortho-cresol and 0.90 grams of 36% hydrochloric acid being charged to the reaction vessel after which 11.25 grams of paraformaldehyde flakes were added otherwise following the conditions and procedures as described in Example I. Again, the same procedures were followed for ethoxylation and for the phosphating, after which the product was adjusted to a substantially neutral pH and water was added to adjust the solids content of the mixture to about 37%.

EXAMPLE IV

The procedure of Example III was repeated using the exact same weights of the same materials, except that only 7.5 grams of paraformaldehyde flakes were added to the reaction vessel. Instead of the 1:1:1.5 ratio of cresol:octylphenol: formaldehyde employed in Example III, which would be expected to produce a polymer having an empirical structural formula which would be a tetramer, the molar ratio of the ingredients in Example IV was 1:1:1 which would be expected to produce a mixture of dimers.

The products produced by Examples II, III and IV (designated Syntans 12, 13, 14, respectively) were evaluated in comparison with that of Example I (Syntan 9) in the manner described hereinbefore. The Maeser Flex Test results for

TABLE V

| Syntan No. | 9 | 12 | 13 | 14 |
|---|---|---|---|---|
| No. of flexes for initial water transmission | 1350 | 5450 | 1350 | 360 |
| Water absorbed as percentage of initial weight of stock after flexes above | 21 | 6 | 95 | 46.3 |

Again, applicants do not, of course, limit themselves to any one theory or even a set of theories which might explain the results obtained or the specified structural formalae or relative amounts of various trimers, tetramers, etc., in the compositions of their invention. On the other hand, the molar ratios of the starting materials, and some generally accepted theories of relative reactivity and hindrance in organic synthesis reactions, do suggest several highly probable conclusions. In Example II the first condensation should result in formation of a methylene bridge, p.p-bis(o-methyl phenol), which was subsequently condensed with the octylphenol to produce a mixture of trimers, tetramers, etc. in which the empirical structural formula, and the largest single component would correspond to the formula:

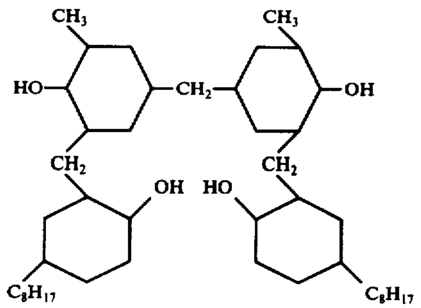

With regard to the condesate produced in Example III, it is generally felt that the relatively high degree of reactivity of the o-cresol, and the high degree of hindrance attributable to the pendant long chain alkyl group in the alkylphenol, should promote first a situ condensation of the o-cresol by itself to form a methyl bisphenol structure of the type noted above, which would then, as in Example II, subsequently condense with the octylphenol to yield a miture of trimers, tetramers, etc. whose empirical structural formula and whose largest single component would be substantially the same as that of Example II, the formula described above.

It was noted hereinbefore that the numbers shown in the various Tables are relative rather than absolute. Thus, there are a number of factors which would affect the results obtained, including the type and batch of leather employed, its thickness, and the other materials employed in the other leather treatment steps. For example, where the compositions of the present invention were used, syntans on leather which had been treated with a stearoto-chrome complex, and with a non-rewetting emulsified oil fat liquor containing an amine neutralized alkylphosphate, test results indicated as many as 500,000 or more flexes before water penetration through the leather.

It will, of course, be obvious the wide variety of changes and substitutions can be made in the materials, compositions, and procedures described hereinbefore without departing from the scope of the invention herein disclosed.

What is claimed is:

1. The product formed by the process of condensing a phenol and an alkylphenol with an aldehyde in the presence of an acid catalyst to form a condensate, which is then alkoxylated and phosphated, comprising the steps of:

a. maintaining a mixture of the phenol, the alkylphenol, and acid catalyst at a temperature from about 50° to about 150° C while slowly adding the aldehyde to the mixture;

b. maintaining said mixture at a temperature of about 60° to about 150° C for an additional period of from about 1 to 5 hours, to form the condensate;

c. adjusting the mixture to a pH higher than 7;

d. alkoxylating the condensate at a temperature from about 100° to about 200° C in an inert atmosphere at a pressure from about 10 to 30 p.s.i.g. with an alkoxylating agent;

e. removing substantially all the water, then adding non-aqueous solvent to form an intermediate-polymer solution;

f. maintaining said intermediate-polymer solution at a temperature from about 60° to about 150° C while adding a phosphating agent, then maintaining the reaction mixture at said temperature for an additional period of from about 1½ to 2½ hours; wherein i. the phenol is selected from at least one of a group consisting of hydroxybenzene, cresoles, ethyl hydroxybenzenes, and fused ring-, polyaryl-, and polyaralkyl- polyphenols having from 2 to 15 benzene rings per molecule, including phenols and polyphenols substituted with at least one member of the group consisting of halogen atoms, nitro radicals, and additional hydroxyl radicals.

ii. the alkyl phenol is selected from at least one of a group consisting of saturated or unsaturated linear or branched chain $C_6$ to $C_{20}$ alkyl substituted phenols.

iii. the phenol moiety of the alkyl phenol is selected from at least one of a group consisting of phenols, thiophenols, and phenols substituted with at least one member of the group consisting of hydroxyl radicals, halogen atoms, nitro radicals, methyl radicals, ethyl radicals, propyl radicals and phenol radicals.

iv. the ratio of phenol to alkylphenol in said condensate being from about 3:1 to about 1:3, and are joined by bridging alkylene radicals.

v. the alkoxylating agent being selected from at least one of a group consisting of ethylene oxide, propylene oxide, butylene oxide and isobutylene oxide.

vi. the phosphating agent being selected from at least one of a group consisting of polyphosphoric acid, phosphoric acid, phosphorous pentoxide, pyrophosphoric acid, phosphorous acid, and phosphorous oxychloride, and vii. further characterized in that the total number of benzene rings contained in one molecule of the condensate is between 3 and 16.

* * * * *